United States Patent [19]

Brombach et al.

[11] Patent Number: 4,816,156

[45] Date of Patent: Mar. 28, 1989

[54] HYDRO-DYNAMIC SEPARATOR

[76] Inventors: Hansjörg Brombach, Von-Berlichingen-Strasse 21, D-6990 Bad Mergentheim/Neunkirchen; Heinrich Hohlwegler, Am Sprait 6, D-6972 Tauberbischofsheim, both of Fed. Rep. of Germany

[21] Appl. No.: 106,116

[22] Filed: Oct. 7, 1987

[30] Foreign Application Priority Data

Oct. 7, 1986 [DE] Fed. Rep. of Germany ....... 3634122

[51] Int. Cl.$^4$ ...................... B01D 17/038; B01D 21/26

[52] U.S. Cl. ................................. 210/512.1; 209/144; 209/211

[58] Field of Search ........................ 55/184; 210/512.1; 209/211, 144

[56] References Cited

U.S. PATENT DOCUMENTS

| | | | |
|---|---|---|---|
| 1,568,413 | 1/1926 | Peebles . | |
| 2,378,632 | 6/1945 | Hooker et al. | 210/57 |
| 2,518,084 | 8/1950 | Smith | 92/28 |
| 2,655,263 | 10/1953 | Chisholm | 209/211 |
| 3,232,430 | 2/1966 | Saint-Jacques | 209/144 |
| 3,425,545 | 2/1969 | Zemanck et al. | 209/2 |
| 3,965,013 | 6/1976 | Jackson | 210/519 |
| 4,094,772 | 6/1978 | Hillekamp et al. | 209/12 |
| 4,147,630 | 4/1979 | Laval, Jr. | 210/137 |
| 4,564,374 | 1/1986 | Hofmann | 55/184 |
| 4,605,495 | 8/1986 | Flynn | 209/211 |

FOREIGN PATENT DOCUMENTS

| | | |
|---|---|---|
| 1461195 | 2/1969 | Fed. Rep. of Germany . |
| 1945922 | 1/1973 | Fed. Rep. of Germany . |
| 2716611 | 10/1978 | Fed. Rep. of Germany . |
| 2613578 | 7/1980 | Fed. Rep. of Germany . |
| 2458157 | 3/1984 | Fed. Rep. of Germany . |
| 8523894 | 12/1985 | Fed. Rep. of Germany . |
| 2117277 | 10/1983 | United Kingdom . |

OTHER PUBLICATIONS

"Swirl and Helical Bend Pollution Control Devices", U.S. E.P.A., Jul. 1982, p. 11.

"Innovative and Alternative Technology Projects", U.S. E.P.A., Sep. 1987, p. 11.

JP-Patents Abstracts of Japan, C-345, May 13, 1986, vol. 10, No. 128, Ref. 60-255161.

"Hydro-Dynamic Separator", Type HY, UFT Umwelt-und Fluid-Technik brochure.

*Primary Examiner*—Frank Sever

*Attorney, Agent, or Firm*—Steele, Gould & Fried

[57] ABSTRACT

A hydro-dynamic separator for separating solids from liquids contains a circular cylindrical container with a slightly funnel-shaped bottom, in whose center is formed a drain. Inflow takes place tangentially in the lower region of the container. The container cover passes through an approximately cylindrical distributor, which is open at the top and bottom. The clean water overflow takes place through a slot-like opening outside the distributor and through the cover.

19 Claims, 5 Drawing Sheets

FIG. 1
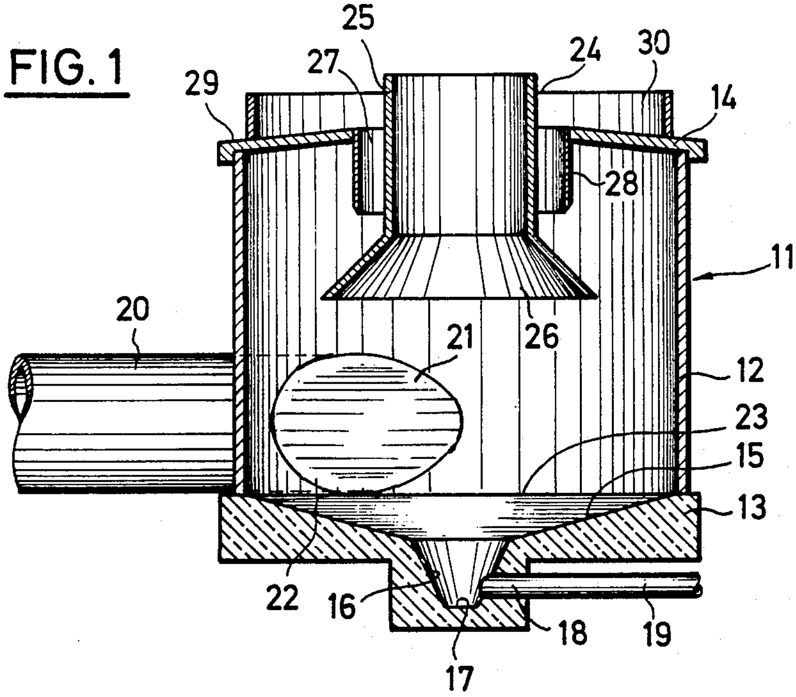
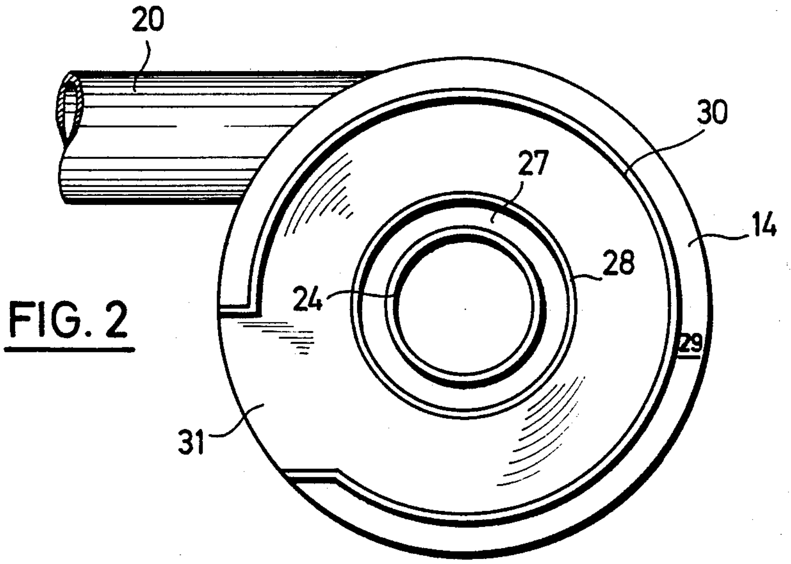
FIG. 2

HYDRO-DYNAMIC SEPARATOR

BACKGROUND OF THE INVENTION

1. Field of the Invention

The invention relates to a separator for separating solids from liquids, with an approximately circular cylindrical container, a feed inlet leading approximately tangentially into the container, a dirty water drain arranged approximately in the center of the container bottom and a circular slot-like overflow in the container cover or lid. Separators of this type are inter alia used in sewage or waste water technology for the purification of the sewage or waste water.

2. Prior Art

A separator of this type is already known (brochure "Hydro-dynamic separator" type HY', UFT Umwelt- and Fluid- Technik). In this known means, the feed inlet leads approximately tangentially into the center of the container height, the inlet port forming a very narrow slot running parallel to the rotation axis of the container. As a result of the polluted water, this slot has a tendency to clog. Above the deposition or sedimentation zone in the container bottom is provided a downwardly widening hopper or funnel, through whose upper narrow opening the water is supposed to flow upwards, leaving behind the solid particles. The overflow takes place through a circular slot in a flat cylindrical region and from the latter through a lateral inlet.

A rainwater tank is also known (German patent No. 19 45 922), in which the inflow takes place tangentially and the outflow is arranged in the center of the tank bottom. This known rainwater tank is intended to obtain an automatic cleaning of deposited dirt. There can also be a discharge threshold, but this is formed by the upper edge of part of the container outer wall. This discharge threshold is arranged in such a way that when the rainwater tank is almost full, further inflowing water does not first pass into said tank, but instead flows over the discharge threshold. However, this means that this water is virtually not cleaned.

In another known rainwater tank (German patent No. 24 58 157) the inflow does not take place at the edge, but instead within the tank bottom, which has a slope of 45°. The overflow once again takes place in the vicinity of the upper edge of part of the circumference. This tank also largely fails to utilize the introduced angular momentum.

SUMMARY OF THE INVENTION

An object of the present invention is to provide a cyclone separator which, in the case of liquids contaminated with solids and with all practically occurring particle sizes has a constantly high separating capacity, short separting times and a small volume and which reliably operates both in the case of draining and overflow.

According to the invention this object is achieved in that the feed inlet has an approximately circular cross-section up to its opening and issues in the vicinity of the bottom of the container jacket and that an approximately cylindrical distributor, which is open at the bottom from at the top in the container projects radially within the overflow. The opening of the feed inlet is formed by the penetration of the two circular cylindrical surfaces. The inflow of liquid takes place at low speeds and with low turbulence levels. The lower edge of the feed tube is substantially aligned with the lower edge of the cylindrical jacket part of the container.

According to a further development of the invention, the diameter of the intake is approximately a quarter to a third of the diameter of the container.

In a further development, the container height is at the most the same as its diameter.

The distributor projecting into the container from above and which can e.g. be fixed to a cover or lid of the container, can be widened according to the invention in roughly funnel-shaped manner in its lower region projecting into the container. For example, this can in cross-section have an undulatory shape. The widening may e.g. only be in the lower region of the part projecting into the container.

According to a further development, the distributor projects through the container cover and its upper edge is higher than the maximum water level in the overflow. The top of the distributor can be open or can be closed by a lid or grid. It then permits the inspection and checking of the container from the inside and in the case of corresponding dimensioning an operator can also enter through it.

According to the invention the distributor can at a minimum be inserted into a third of the container height. In other words, the axial length of the distributor part inserted in the container is at the least a third of the container height and preferably somewhat more.

The overflow through which in the overflow case the clean water can flow to a main canal or ditch, can be formed according to the invention between the edge of an opening of the cover and the outside of the distributor, which helps to stabilize the flow of overflowing water. It is also possible for the outer boundary of the overflow to be formed by an immersion wall penetrating the container interior. This immersion wall, which can project somewhat over the top of the cover, is in the axial direction preferably much shorter than the distributor part projecting into the container.

The diameter of the cross-sectionally circular distributor is preferably roughly as large as a third or half the container diameter.

On the top of the cover preferably in the marginal region is provided a wall surrounding the overflow and this forms an outflow to a main canal. This space located within the wall above the container can serve as an additional damming-up space.

The drain from the container is preferably arranged centrally in the shallow funnel-like container bottom and can have a somewhat more inclined funnel shape. The outflow then preferably takes place laterally out of the side wall of the outflow funnel or hopper and advantageously somewhat above the bottom of the latter.

According to a further development, the bottom of the container is constructed as a convex shell, which in its edge region preferably passes in rounded manner into the container jacket. This not only leads to an improved strength of the cyclone separator, which is imporant if it is constructed from sheet steel, but it makes it possible to so position the feed line that the opening engages in the rounded transition region. This leads to an improvement of the flow and to a very small height loss.

The bottom of the outflow hopper can have a removable plug which can be used for closing it. This plug is e.g. removable with the aid of a rod passed through the distributor, so that every so often larger deposits on the drain hopper bottom can be removed.

Advantageously the cyclone separator is positioned adjacent to a distributor structure with at least two compartments, from whose one compartment the feed line passes into the cyclone separator container and into whose other compartment connected to a main canal flows the water leaving the overflow. The distributor structure can e.g be built from concrete or bricks, whereas the actual cyclone separator with its casing can be constructed from sheet steel.

It is in particular possible for a partition separating the two compartments of the distributor structure to have an upper edge, which is lower than the upper edge of the distributor structure. This means that in the case of very heavy rain and for a long period the inflow into the separator is greater than the outflow therefrom, the water from the distributor structure can flow directly into the main canal. It is particularly favorable if two symmetrically constructed cyclone separators are symmetrically juxtaposed.

BRIEF DESCRIPTION OF THE DRAWINGS

Further features, details and advantages of the invention can be gathered from the following description of preferred embodiments thereof and the attached drawings, wherein:

FIG. 1 is a cross-section through a first embodiment of a cyclone separator according to the invention.

FIG. 2 is a plan view of the arrangement of FIG. 1.

DETAILED DESCRIPTION OF THE PREFERRED EMBODIMENTS

Figure 3:
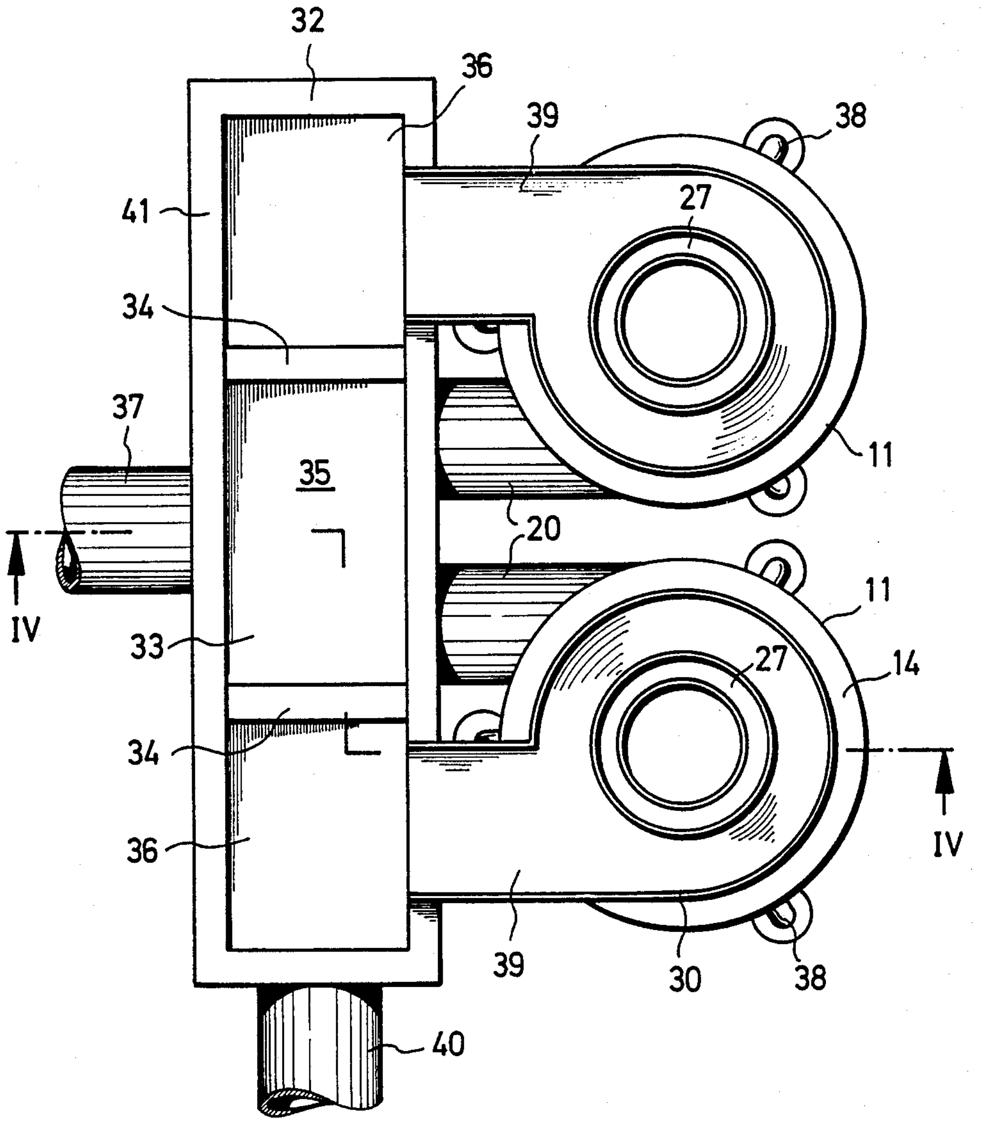
FIG. 3 is a plan view of a second embodiment with two cyclone separators.

The cyclone separator embodiments shown in the drawings relate to the field of sewage technology, in which the liquid to be cleaned is sewage or waste water. The separator proposed by the invention is not, however, restricted to this field of application. The cyclone separator shown in FIG. 1 contains a container 11, which is formed by a circular cylindrical jacket 12, which rests on a bottom part 13. The jacket 12 is terminated at its top by a cover 14. Bottom 13 has a shallow funnel-shaped inside 15, in whose center is arranged a more markedly sloping outflow hopper 16. Somewhat above the bottom 17 of outflow hopper 16 is provided in the side wall thereof an opening 18, which is connected with a not further illustrated outflow line 19, which is approximately horizontal. At its not-shown end is advantageously provided a waste water constrictor, which limits the outflow.

In the vicinity of the lower portion of cylinder jacket 12, a cross-sectionally circular feed line 20 issues into container 11. The shape of opening 21 is the penetration of the circular cylindrical shape of feed line 20 with the circular cylindrical shape of casing jacket 12. The lower edge 22 of opening 21 of feed line 20 is substantially flush with the lower edge 23 of cylinder jacket 12.

In a central opening in cover 14 is inserted and fixed a distributor 24, which at the top projects above the top surface of cover 14 and below cover 14 extends well over a third of the height of container 11 into the latter. The distributor is preferably circular cylindrical in its upper region 25, whereas in its lower region 26, which roughly corresponds to a third of its axial length, it is constructed in funnel or hopper-shaped manner. The hopper widens downwards into the interior of the container. Whereas in the represented embodiment the cross-section is linear, the shape could also be bent in such a way that there would be a gradual undulatory transition between regions 25 and 26.

Immediately outside distributor 24 a circular opening 27 is formed in cover 14 and this forms the overflow for the cyclone separator. The overflow opening 27 is bounded on its radial inside by the cylindrical upper region 25 of the distributor 24 and on its outside by an immersion wall 28. The latter is fixed to cover 14 and projects into the interior of the cyclone separator casing 11. It does not project quite as far into casing 11 as the cylindrical portion 25 of the distributor.

Whereas in the represented embodiment immersion wall 28 does not project over the top of cover 14, this could be different in another embodiment, so that a waste weir would then be formed. The top surface of distributor 24 is open and for safety reasons could be provided with a grating or the like.

In the vicinity of the outer edge of the top surface 29 of cover 14 is provided a wall 30, which extends over most of the circumference of container 11. It prevents water flowing out of the overflow opening 27 from leaving the cover 14 to all sides and instead leads said water to a specific point, where it can then be passed on in planned manner.

FIG. 2 is a plan view of the cyclone separator according to FIG. 1 and for simplification reasons the interior of container 11 is not shown. It can be seen that the inlet 20 passes tangentially into container 11. The diameter of the feed pipe 20 has a value which is between a quarter and a third of the diameter of container 11 and there is no constriction at the issuing point 21.

The wall 30 substantially concentric to container 11 and fitted to the top 29 of container cover 14 is arranged in such a way that it roughly tangentially leaves a point 31 free, at which it is possible for the water leaving the overflow opening 27 to flow out.

The cyclone separator shown in FIGS. 1 and 2 functions as follows. The liquid from which solids are to be removed and which is in the present case constituted by mixing water, flows in through feed line 20. With increasing inflow the interior of container 11 fills. The backwash is produced by the waste water constrictor placed in the outflow line 19. The inflow momentum is taken up by the body of water and converted into a rotary movement and this movement rapidly flushes all dirt to the outlet. Separation processes also occur, but they initially have no effect, because all the water is remixed with the separated substances in the drain hopper 16.

However, interest is attached to the behavior of the cyclone separator in the case of overflow. Heavier matter rolls directly along the bottom into the drain hopper 16. Lighter matter passes in the rotary movement of the body of water and is forced outwards by the centrifugal force. Such matter passes partly into the laminar boundary layer or interface of the vortex chamber jacket and sinks downwards close to the wall. The boundary layer at the bottom cone largely protects such matter from whirling up again on the way to the drain hopper 16.

The very light matter virtually has no effect on the centrifugal forces. A large part of such matter is led past the large surfaces of immersion wall 28 and distributor 28 along the long spiral path through the vortex chamber. Wall friction induces a gentle secondary flow towards the wall boundary layer. On this path much fine matter is trapped from the flow and sinks downwards.

The function of the distributor is to collect the particles which have been sucked upwards again from drain hopper 16 in the center of the rotary flow. The particles drop downwards again on the inner wall of the distributor. The latter has the additional function of separating and stabilizing two flow types in the cyclone separator. In the region outside the distributor and particularly in the upper part of the vortex chamber, due to the large throughflows, there is mainly an inverted vortex sink flow. Such vortex flows have a very limited turbulence, which aids the escape of dirt particles into the boundary layers. In the center of the vortex chamber and particularly in the vicinity of the drain hopper 16, as a result of the friction artificially produced by distributor 24 and the limited draining out through the constrictor, the flow tends toward a rotational movement.

FIG. 3 shows the arrangement of two symmetrically constructed and positioned cyclone separators and their interaction with a distributor structure 32. The latter contains a central compartment 33, which is separated by two partitions 34 and a bottom 35 from the two outer compartments 36. Into the central compartment 33 issues a line 37, which introduces the waste water into the central compartment 33. From the central compartment 33 two short feed lines 20 lead to the two containers 11 of the cyclone separators. The cyclone separators are constructed in much the same way as in FIG. 1, but are made from sheet metal parts and are installed on a plate with the aid of in each case three legs 38.

The walls 30 fitted to the top surface of cover 14 of the separator container 11 lead the clean water passing from the overflow 27 via in each case one drain path 39 into the two outer compartments 36 of the distributor structure 32. A line 40 leads from one of the two outer compartments 36 to a main canal or ditch. The upper edge of the partitions 34 is lower than the edge 41 of the distributor structure 32, so that in the case of strong and long-lasting rainfall, if the drain permitted by the overflow opening 27 is not sufficient, the water from the central compartment 33 can pass directly via the two partitions into the outer compartments 36.

Figure 4:
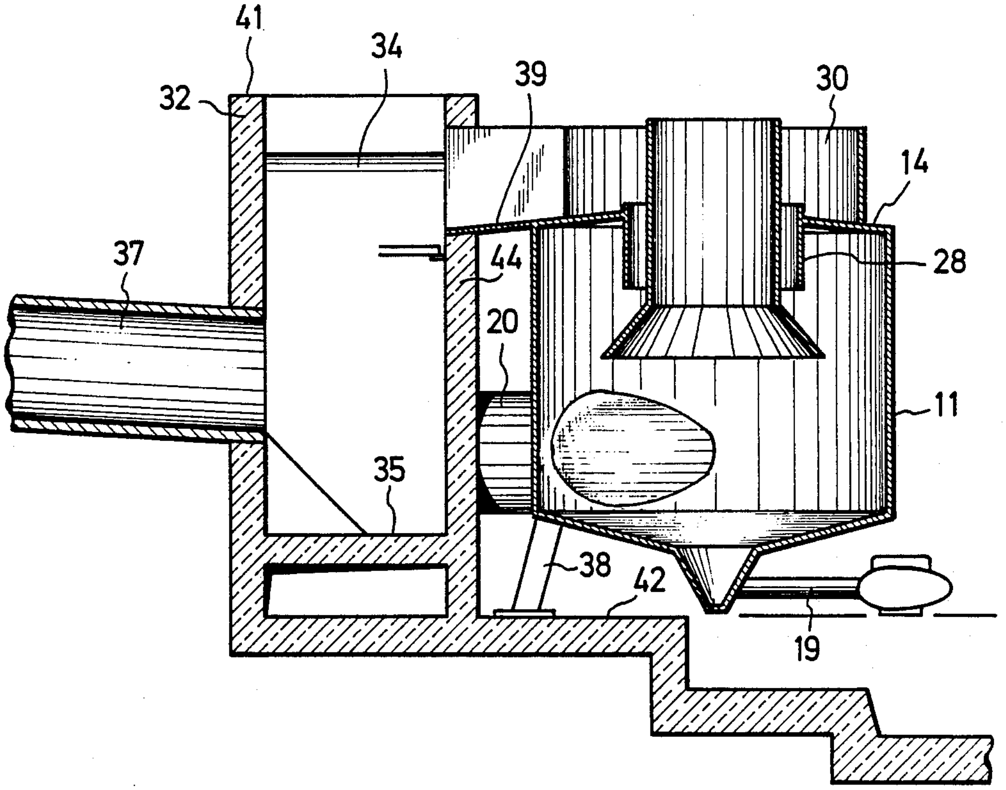
FIG. 4 is a bent section through the arrangement of FIG. 3 along line IV—IV of FIG. 3.
Figure 5:
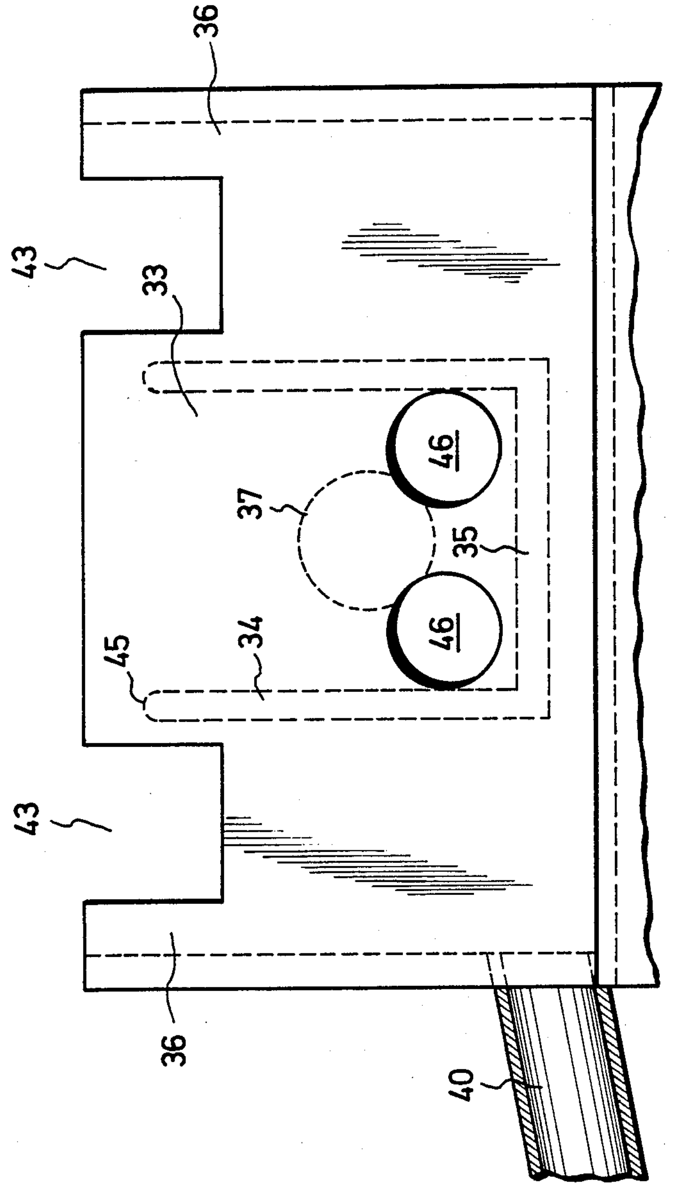
FIG. 5 is a view of the distributor structure of FIGS. 3 and 4 from the right.

FIG. 4 shows how the containers 11 of the separator are set up on a plate 42, which forms part of the distributor structure 2. The shape of the container is substantially the same as in the embodiment according to FIG. 1, but is made from sheet steel. The wall 30, placed round the overflow opening 27, is high and surrounds at a considerable height the drain path 39 on either side. The drain path with side walls 30 leads through a corresponding slot 43 in longitudinal walls 44 facing the containers. This slot 43 can be seen in FIG. 5, which is a view of the corresponding longitudinal wall 44 from the right in FIGS. 3 and 4 with the cyclone separator not yet installed. It can be seen that the central compartment 33 is formed by the two partitions 34 with rounded upper edges 45 and the bottom 35. Into this central compartment 33 issues the inflow line 37 on one side, whilst the feed lines 20 to the containers 11 of the cyclone separator pass out of the front wall 44 and for this purpose openings 46 are provided.

The two outer compartments 36 are interconnected below the bottom 35 of inner compartment 33, so that the water can pass from the two outer compartments 36 through line 40 to the main ditch.

As can be gathered from FIG. 4, the immersion wall 28 projects somewhat above the top of the container cover 14. Line 37 enters above the bottom 35 of central compartment 33. The lower edge of feed line 20 to the separators and therefore the lower edge of opening 46 is also above bottom 35. Thus, in the central compartment 33 is formed a shingle trap, which can hold back stones and the like and can be removed every so often from the compartment.

Figure 6:
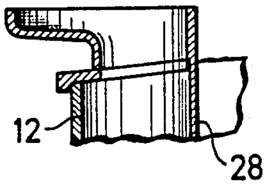
FIG. 6 is a floating partial section of a matter trap.
Figure 7:
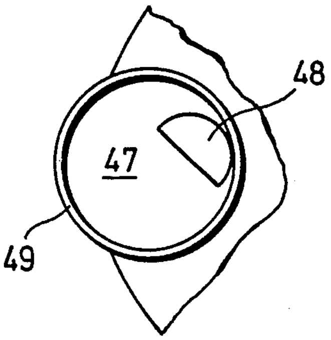
FIG. 7 is a plan view of the floating matter trap of FIG. 6.

FIGS. 6 and 7 shows a floating matter trap, as can be arranged in the marginal region of container 11. In the area between jacket 12 and immersion wall 28 floating matter is retained. In order to ensure that under unfavourable circumstances and very strong flow, such floating matter can also pass out through the overflow 27, it is possible to provide such a floating matter trap, whose bottom 47 has a relatively small opening 48. The opening 48 in the bottom of the floating matter trap is shaped like a semicircle with a radius, which is roughly half as large as the radius of the boundary 49 of said trap. The linear part of the opening is displaced by approximately 45° with respect to the radius of the container cross-section and the opening is radially inwardly displaced with respect to container 11.

Figure 8:
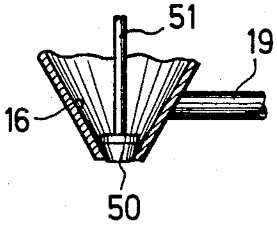
FIG. 8 is a section through a drain hopper with a removable plug.

FIG. 8 shows the outflow hopper 16 in an embodiment, in which the bottom of said hopper 16 is formed by a plug located at the lower end of a rod 51, which extends up to the upper edge of distributor 24. After opening the cover of distributor 24 plug 50 can be drawn out of the drain hopper 16 with the aid of rod 51, so that contaminants which have collected there can be removed or flushed out downwards.

Figure 9:
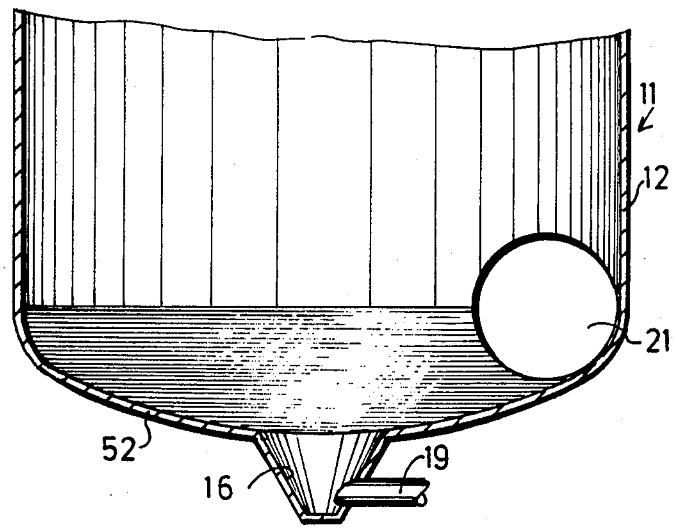
FIG. 9 is a partial section through a modified embodiment.

FIG. 9 shows a section through the lower region of another embodiment of a cyclone separator. The bottom 52 of container 11 is here formed by a flat, convex shell, whose edge is rounded and passes flush into the cylindrical jacket 12 of container 11. The feed line is positioned somewhat deeper than in the preceding embodiments, which is made possible through the rounded transition between bottom 52 and jacket 12. Opening 21 engages in said transition. The height loss between feed line 20 and outflow line 19 is consequently made even smaller, whilst container 11 is made stronger and more stable.

We claim:

1. A hydro-dynamic separator for separating solids from liquids, comprising:

an approximately circular cylindrical container (11);

a feed inlet (20) leading approximately tangentially into the container (11), a dirty water drain being arranged roughly centrally in a bottom (13) of the container, and a circular slot-like overflow (27) being defined in a cover (14) of the container, and wherein the feed inlet (20) has an approximately circular cross-section up to an opening thereof into the container and the feed inlet issues in a lower region of a jacket (12) of the container and on the container cover (14) is positioned radially within the overflow (27) a roughly cylindrical distributor (24) which is open at a bottom thereof and projects from above into the container;

including means in a case of liquids contaminated with solids in a variety of particle sizes, for enabling the separator to have constantally high separating capacity, short separating time and a small volume, operating both in cases of draining and overflow.

2. A hydro-dynamic separator for separating solids from liquids, comprising:

an approximately circular cylindrical container;

a feed inlet leading approximately tangentially into the container, a dirty water drain being arranged roughly centrally in a bottom of the container, and a circular slot-like overflow being defined in a cover of the container, and wherein the feed inlet has an approximately circular cross-section up to an opening thereof into the container and the feed inlet issues in a lower region of a jacket of the container and on the container cover is positioned radially within the overflow a roughly cylindrical distributor which is open at a bottom thereof and projects from above into the container;

including means in a .case of liquids contaminated with solids in a variety of particle sizes, for enabling the separator to have constantally high separating capacity, short separating time and a small volume, operating both in cases of draining and overflow.

3. Separator according to claim 1 or 2, wherein the inlet (20) has a diameter approximately a quarter to a third of a diameter of the container (11).

4. Separator according to claim 1 or 2, wherein the container (11) has a at most equal to a diameter of the container (11).

5. Separator according to claim 1 or 2, wherein the distributor (24) widens in roughly funnel-shaped manner in a lower region of the distributor (24) projecting into the container (11).

6. Separator according to claim 1 or 2, wherein the distributor (24) passes through the container cover (14) and an upper edge of the distributor is higher than a maximum water level.

7. Separator according to claim 1 or 2, wherein the distributor (24) is open at a top thereof.

8. Separator according to claim 1 or 2, wherein the distributor (24) encompasses at least one third of a height of the container.

9. Separator according to claim 1 or 2, wherein the distributor (24) has a diameter approximately a third to a half as large as a diameter of the container (11).

10. Separator according to claim 1 or 2, wherein the overflow (27) is formed between an opening edge of the cover (14) and an outside of the distributor (24).

11. Separator according to claim 1 or 2, wherein, an outer boundary of the overflow (27) is formed by an immersion wall (28) projecting into an interior of the container.

12. Separator according to claim 1 or 2, wherein a rim (30) is formed on the cover (14) of the container (11).

13. Separator according to claim 1 or 2, wherein the container has a shallow hopper-shaped bottom (13) at which is provided a highly sloping outflow hopper (16) from which the outlet (19) passes laterally.

14. Separator according to claim 13, wherein the outflow hopper (16) has a bottom (17) with a removable plug (50).

15. Separator according to claim 1 or 2, wherein the separator is positioned adjacent to a distributor structure (32) with at least two compartments (33, 36), from one compartment (33) of which the feed line (20) leads into the container (11) and into whose other compartment (36) flows water leaving the overflow (27), the compartment (36) being connectable to a main ditch.

16. Separator according to claim 15, wherein an upper edge of a partition (34) separating the two compartments (33, 36) is lower than an upper edge (41) of the distributor structure (32).

17. Separator according to claim 15 or 16, comprising two symmetrically constructed cyclone separators arranged symmetrically to one another.

18. Separator according to claim 1 or 2, wherein a bottom (52) of the container (11) is constructed as a convex shell, whose edge passes into the jacket (12).

19. Separator according to claim 18, wherein an opening (21) of the feed line (20) into the container is disposed in a transition area between the jacket (12) and the bottom (52).

* * * * *